Oct. 13, 1942.  R. JONGEDYK  2,298,887
STRIPPER FOR EXTRUDING APPARATUS
Filed March 13, 1941
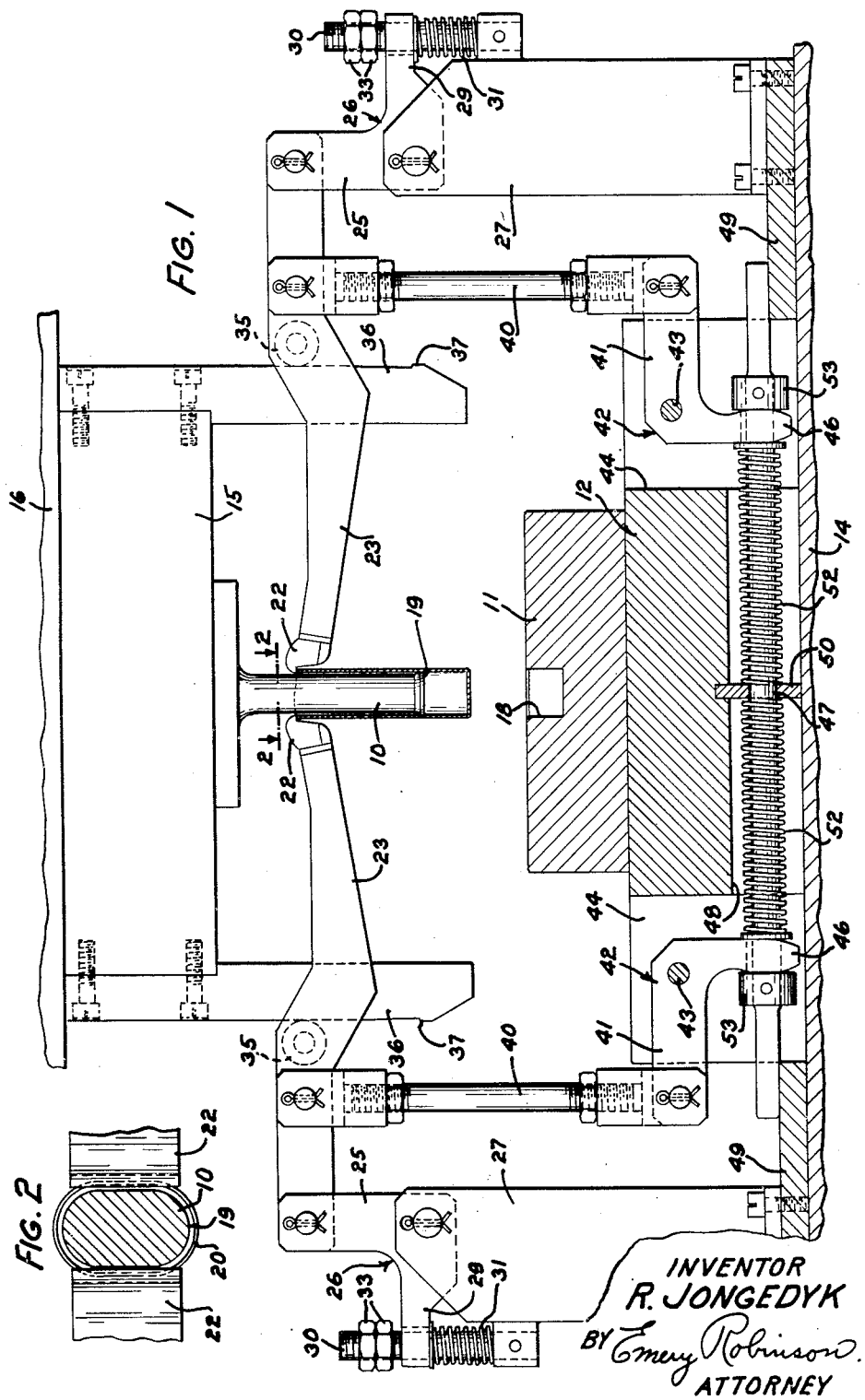
INVENTOR
R. JONGEDYK
BY Emery Robinson
ATTORNEY Patented Oct. 13, 1942

2,298,887

UNITED STATES PATENT OFFICE 2,298,887

STRIPPER FOR EXTRUDING APPARATUS

Ralph Jongedyk, Hinsdale, Ill., assignor to Western Electric Company, Incorporated, New York, N. Y., a corporation of New York Application March 13, 1941, Serial No. 383,151

8 Claims. (Cl. 207—1)

This invention relates to extruding apparatus and more particularly to improvements in extruding apparatus of the type employed for producing hollow articles, such as seamless containers, by a so-called backward extrusion process, in which a portion of a metal slug is squeezed or extruded through a space between a vertically reciprocable punch and a cooperating die cavity and is caused to flow upwardly along the shank of the punch to form the wall of the container.

An object of the present invention is to provide, in extruding apparatus of the type referred to, a simple, inexpensive and efficient stripper mechanism for removing the extruded articles from the extruding punch.

In accordance with one embodiment of the invention, there is provided, in an extruding apparatus of the type referred to, a mechanical stripper mechanism comprising a pair of stripper members disposed on opposite sides of the vertically reciprocable extruding punch and interconnected by equalizing linkage adapted to insure the application of equal stripping pressures simultaneously to opposite sides of the extruded articles and thus avoid sticking or binding of the articles on the extruding punch.

A complete understanding of the invention will be had by reference to the following detailed description when considered in conjunction with the accompanying drawing, in which—

Fig. 1 is a fragmentary elevational view, partly in section, of an extruding apparatus equipped with a stripper mechanism embodying the invention, and Fig. 2 is an enlarged fragmentary plan section taken on the line 2—2 of Fig. 1.

The invention is illustrated in the drawing as embodied in an extruding press comprising a vertically reciprocable extruding punch or plunger 10 and a cooperating die 11, the latter being fixed to a die supporting block 12 attached to the stationary bed 14 of the press. The extruding punch is attached to a punch holder 15, which is fixed to the vertically reciprocable platen or ram 16 of the press.

The die has a die cavity 18 adapted to receive the slightly enlarged end portion 19 of the punch, which is of somewhat smaller cross section than the die cavity. The construction is such that when a metal slug placed in the die cavity is compressed by the punch, a portion of the slug is extruded or squeezed upwardly through the space between the punch and the wall of the die cavity. The extruded portion of the metal slug flows upwardly along the shank of the punch to form the wall of a can or container while the portion of the slug remaining between the end of the punch and the bottom of the die forms the bottom of the container. This process of extruding tubular containers from metal slugs is well known in the art. Therefore, no further description thereof is necessary to a complete understanding of the present invention, which pertains, primarily, to a novel and efficient mechanism for removing or stripping the extruded containers from the extruding punch.

The extruding punch is shown in the drawing at an intermediate point in its upward movement, and an extruded can or container 20 is shown partially stripped from the punch. The stripper mechanism illustrated in the drawing, by way of example, comprises two claw-like stripper members 22—22 disposed on opposite sides of the extruding punch and adapted to engage the upper edge of the extruded container and thereby strip it from the punch as the latter is elevated to its retracted position. Each stripper member is attached to the free end of a separate arm 23, which is pivotally connected to a vertical arm 25 of a bell crank lever 26 pivotally mounted in an upstanding bracket 27 fixed to the bed of the press. Each bell crank lever has a bifurcated horizontal arm 29, which slidably straddles a vertical post 30 fixed to the bracket 27. On each post 30, there is provided a compression spring 31, which presses upwardly against the underside of the horizontal arm 29 of the associated bell crank lever 26 and thereby urges the associated stripper arm 23 toward the extruding punch. A pair of nuts 33—33 threaded on the upper ends of the post 30 serve as a stop for limiting the movement of associated bell crank lever 26 under the force of spring 31.

Each of the stripper arms 23 is equipped with a roller 35, which is pressed by the spring 31 against a cam bar 36 secured to and depending from the punch holder 15. The cam bars 36 serve to prevent scratching of the punch by the stripper members by maintaining them slightly spaced from the punch during the stripping operation. Each cam bar has a raised portion 37 near its lower end for shifting the stripper members farther away from the punch to permit the enlarged lower end portion 19 of the punch to pass freely between the stripper members during the upward and downward movements of the punch.

Each of the stripper arms 23 is pivotally connected intermediate its ends to the upper end of a vertical link 40, which is pivotally connected at its lower end to a horizontal arm 41 of a bell crank lever 42. Each of these bell crank levers is pivoted on a horizontal pin 43 in the die block 12. Vertical slots 44—44 are provided in the die block to accommodate the bell crank levers 42, each of which has a bifurcated depending arm 46 adapted to slidably straddle a horizontal slide bar 47. The die block is formed with a bottom groove or tunnel 48 for accommodating slide bar 47, which is slidably supported at each end upon a plate 49 fixed to the bed of the press. Intermediate its ends, the slide bar is slidable in a vertical partition plate 50 rigidly secured to the die block. Two similar compression springs 52—52 of the same length and tension are provided on the slide bar, one on each side of the partition plate 50. These springs serve to normally hold the depending arms of bell crank levers 42 against collars 53—53 fixed to the slide bar near opposite ends thereof. By exerting upon the slide bar equal forces in opposite directions, the two springs 52 serve to normally hold the slide bar in an intermediate position in which the two stripper members are disposed in substantially the same horizontal plane. These springs also serve to provide elastic connections between the stripper members and the slide bar, whereby the stripper members are permitted to move downwardly with the punch during the final portion of its downward movement. This downward movement of the stripper members is taken up by compressing the springs 52 and these springs automatically return the stripper members to their normal positions during the initial portion of the upward movement of the punch. This construction, obviously, permits the use of a punch considerably shorter than would be required if a stationary stripper mechanism were employed.

In the operation of the apparatus, a metal slug is placed in the die cavity 18 while the punch is in its uppermost position, after which the punch is moved downwardly by the press mechanism into compressing engagement with the slug, thus causing the slug to be extruded into a seamless container in a manner well known in the art. The punch with the extruded container adhering thereto is then elevated or withdrawn from the die cavity. Upon the container being elevated with the punch to a position above the die cavity, the upper edge of the extruded wall of the container engages the stripper members 22, which prevents further upward movement of the container, and thus causes the stripping of the container from the punch as the latter continues to move upwardly to its uppermost position.

As will be apparent from an inspection of Fig. 1 of the drawing, the vertical links 40, together with the bell crank levers 42 and the interconnecting slide bar 47, constitute an equalizing mechanism which automatically shifts the stripper members relative to each other to compensate for the usual irregularities or unevenness in the upper edge of the extruded container and thus insure the application of equal stripping pressures simultaneously to opposite sides of the container. For example, when the irregularity of the upper edge of the extruded container is such that it engages one of the stripper members in advance of the other, the first engaged stripper member is moved upwardly by the container until the other stripper member is engaged by the container. Upon upward movement of the first engaged stripper member, a corresponding downward movement is transmitted to the other stripper member through the vertical links 40, the bell crank levers 42 and the interconnecting slide bar 47. Thus, it will be obvious that no appreciable stripping pressure is applied to the container until it is engaged by both stripper members. This insures the simultaneous application of equal stripping pressures to opposite sides of the container, which greatly facilitates the stripping thereof from the extruding punch without damaging the punch or the container.

It is to be understood that the invention is not limited to the particular embodiment thereof herein illustrated and described, but is capable of other applications within the scope of the appended claims.

What is claimed is:

1. In an extruding apparatus having an extruding die and a cooperating extruding punch, a pair of stripper members mounted for movement relative to the punch in a direction longitudinally of said punch, said stripper members being movable relative to each other in a direction longitudinally of the punch, and means responsive to a movement of one of said stripper members in one direction longitudinally of the punch for moving the other stripper member in the opposite direction.

2. In an extruding apparatus having an extruding die and a cooperating extruding punch, a pair of stripper members mounted for movement relative to the punch in a direction longitudinally of said punch, said stripper members being movable relative to each other in a direction longitudinally of the punch, and equalizing linkage interconnecting said stripper members whereby movement of one stripper member in one direction longitudinally of the punch causes movement of the other stripper member in the opposite direction.

3. In an extruding apparatus having an extruding die and a cooperating extruding punch, a pair of stripper members mounted for movement relative to the punch in a direction longitudinally of said punch, said stripper members being movable relative to each other in a direction longitudinally of the punch, equalizing linkage interconnecting said stripper members whereby movement of one stripper member in one direction longitudinally of the punch causes movement of the other stripper member in the opposite direction, and an elastic connection in said linkage for permitting simultaneous movement of both stripper members in the same direction.

4. In an extruding apparatus, the combination with an extruding punch, of means for stripping extruded articles therefrom, said means comprising a pair of stripper members arranged on opposite sides of the punch for engagement with separated portions of the end surface of an extruded article on the punch, said stripper members being movable relative to the punch in a direction longitudinally of the punch, said stripper members being movable also relative to each other longitudinally of the punch to accommodate irregularities in the end surface of the article, and means for causing said stripper members to simultaneously apply equal stripping pressures to the end surface of the extruded article to strip it from the punch.

5. In an extruding apparatus, the combination with an extruding punch, of means for stripping extruded articles therefrom, said means comprising a pair of stripper members arranged on opposite sides of the punch for engagement with separated portions of the end surface of an extruded article on the punch, said stripper members being movable relative to the punch in a direction longitudinally of the punch, said stripper members being movable also relative to each other in a direction longitudinally of the punch and thereby self-adjustable to irregularities in the end surface of the article, and equalizing linkage interconnecting said stripper members for causing them to simultaneously apply equal stripping pressures to the end surface of the article to strip it from the punch.

6. In an extruding apparatus, the combination with an extruding punch, of means for stripping extruded articles therefrom, said means comprising a pair of stripper members arranged on opposite sides of the punch for engagement with separated portions of the end surface of an extruded article on the punch, said stripper members being movable relative to the punch in a direction longitudinally of the punch, said stripper members being movable also relative to each other in a direction longitudinally of the punch and thereby self-adjustable to irregularities in the end surface of the article, equalizing linkage interconnecting said stripper members for causing them to simultaneously apply equal stripping pressures to the end surface of the article to strip it from the punch, and an elastic connection in said linkage for permitting simultaneous movement of both stripper members in the same direction longitudinally of the punch.

7. In an extruding apparatus, the combination with an extruding punch, of means for stripping extruded articles therefrom, said means comprising a pair of stripper members arranged on opposite sides of the punch for engagement with separated portions of the end surface of an extruded article on the punch, said stripper members being movable relative to the punch in a direction longitudinally of the punch, said stripper members being movable also relative to each other in a direction longitudinally of the punch, and means responsive to a movement of one of said stripper members in a direction longitudinally of the punch for moving the other stripper member in a direction opposite to the first mentioned direction.

8. In an apparatus for extruding tubular articles, the combination with an extruding punch, of means for stripping extruded articles therefrom, said means comprising a pair of stripper arms arranged on opposite sides of the punch, each stripper arm having a stripper member at one end thereof for engaging the end surfaces of extruded articles on the punch, said stripper arms being pivotally mounted on an axis in a plane perpendicular to the direction of movement of the punch so that said stripper members are relatively movable longitudinally of the punch, and means interconnecting said stripper arms for causing said stripper members to simultaneously apply equal stripping pressures to the end surfaces of extruded articles while being stripped from the punch.

RALPH JONGEDYK.